US012352395B1

(12) United States Patent
Cao

(10) Patent No.: US 12,352,395 B1
(45) Date of Patent: Jul. 8, 2025

(54) LAMP HOLDER AND MAGNETIC LIGHTING DEVICE

(71) Applicant: Zhenkun Cao, Guangdong (CN)

(72) Inventor: Zhenkun Cao, Guangdong (CN)

( * ) Notice: Subject to any disclaimer, the term of this patent is extended or adjusted under 35 U.S.C. 154(b) by 0 days.

(21) Appl. No.: 18/950,024

(22) Filed: Nov. 16, 2024

(51) Int. Cl.
*F21K 9/238* (2016.01)
*F21V 9/00* (2018.01)
*F21V 23/06* (2006.01)

(52) U.S. Cl.
CPC ................ *F21K 9/238* (2016.08); *F21V 9/00* (2013.01); *F21V 23/06* (2013.01)

(58) Field of Classification Search
CPC ............. F21K 9/238; F21V 9/00; F21V 23/06
See application file for complete search history.

(56) References Cited

U.S. PATENT DOCUMENTS 9,413,104 B2 * 8/2016 Liao ................... H01R 13/6205
2013/0043781 A1 * 2/2013 Wang ...................... F21K 9/232 313/46
2014/0099801 A1 * 4/2014 Liao ................... H01R 13/6205 439/39
2016/0097522 A1 * 4/2016 Chien .................... H05B 47/16 362/183
2017/0321850 A1 * 11/2017 Chien ....................... F21K 9/60
2018/0145446 A1 * 5/2018 Archuleta .............. H01R 33/94

FOREIGN PATENT DOCUMENTS

CN 215061471 U * 12/2021

OTHER PUBLICATIONS

English translation of Wang CN-215061471-U (Year: 2021).*

* cited by examiner

*Primary Examiner* — Evan P Dzierzynski
(74) *Attorney, Agent, or Firm* — Daniel M. Cohn

(57) ABSTRACT

A lamp holder, related to a technical field of lighting devices, is provided. The lamp holder is configured to cooperate with the bulb, including a lamp holder housing and a first magnetic assembly. A charging protection board is disposed in the lamp holder housing and is electrically connected to an external circuit. The first magnetic assembly is configured to attract the bulb for fixing the bulb on the lamp holder housing. A charging connector is disposed on the charging protection board, the charging connector is configured to insert into and connect with a charging interface of the blub, so as to supply power to an internal power supply of the bulb. Based on above, when the lighting assembly in the bulb fails, only a new bulb needs to be replaced to allow for continued lighting without replacing an entire lighting device of the magnetic lighting device.

12 Claims, 4 Drawing Sheets

LAMP HOLDER AND MAGNETIC LIGHTING DEVICE

TECHNICAL FIELD

The present disclosure relates to a technical field of lighting devices, and in particular to a lamp holder and a magnetic lighting device that is easy to power.

BACKGROUND

Lamp holders refer to appliances that enable light transmission, light distribution, and altering of the light distribution, each including all parts required for fixing and protecting a light source, excluding the light source, and wiring accessories necessary for connecting to a power supply. Currently, lighting devices encompasses residential lighting, commercial lighting, industrial lighting, road lighting, landscape lighting, and special-purpose lighting, and the lighting devices are also categorized into wall-mounted lighting devices and handheld devices according to mounting methods. Specifically, the wall-mounted lighting devices are typically considered to be wall lamps, most of which are mounted on ceilings at a considerable height from the ground. In the prior art, most of the wall-mounted lighting devices connect the lamp holders to bulbs via magnetic attraction.

Nowadays, the wall lamps rely on mains electricity, once the mains electricity is interrupted, the wall lamps cannot function, which may bring inconvenience to people. To address such issue, emergency wall lamps are provided in the market. Current emergency wall lamps generally connect a battery-powered bulb to a corresponding lamp holder via the magnetic attraction, which is capable of functioning without the mains electricity. However, such design still has some drawbacks, the battery-powered bulb needs to be frequently charged, and needs to be removed from the corresponding lamp holder when every time being charged, which is complex and inconvenient. Moreover, for people with limited manual dexterity, there are also safety hazards, such as falling off from a height. Therefore, there is room for improvement.

SUMMARY

A main purpose of the present disclosure is to provide a lamp holder and a magnetic lighting device being easy to power, aiming to solve a technical problem of safety incidents caused by frequently detaching of a bulb of the magnetic lighting device for charging.

In order to achieve the main purpose, the present disclosure provide the lamp holder configured to cooperate with the bulb, including a lamp holder housing and a first magnetic assembly. A charging protection board is disposed in the lamp holder housing and is electrically connected to an external circuit. The first magnetic assembly is configured to attract the bulb for fixing the bulb on the lamp holder housing. A charging connector is disposed on the charging protection board, the charging connector is configured to insert into and connect with a charging interface of the blub, so as to supply power to an internal power supply of the bulb.

Furthermore, the lamp holder further includes a lamp holder bottom plate, the lamp holder bottom plate is detachably disposed at an opening end of the lamp holder housing for sealing the opening end of the lamp holder housing.

Furthermore, an inner wall of the lamp holder housing is connected to the lamp holder bottom plate through limiting components, and an outer peripheral surface of the lamp holder bottom plate abuts against an inner wall surface of the lamp holder housing.

Furthermore, first ends of a first part of the limiting components are fixedly connected to the inner wall surface of the lamp holder housing and second ends of the first part of the limiting components are connected to the lamp holder bottom plate through screws, or, the first ends of the first part of the limiting components are connected to the inner wall surface of the lamp holder housing through the screws and the second ends of the first part of the limiting components are fixedly connected to the lamp holder bottom plate. First ends of a second part of the limiting components are fixedly connected to the inner wall surface of the lamp holder housing, second ends of the second part of the limiting components face the lamp holder bottom plate, limiting shafts are disposed on a first surface of the lamp holder bottom plate facing an interior of the lamp holder housing corresponding to the second ends of the second part of the limiting components.

An interval is defined between the limiting shafts and the second part of the limiting components, a first part of the charging protection board is clamped in the interval, and a second part of the charging protection board is sleeved around peripheries of the first part of the limiting components connected to the lamp holder bottom plate.

Furthermore, a groove is defined on a second surface of the lamp holder bottom plate facing away from the interior of the lamp holder housing, and the first magnetic assembly is disposed in the groove.

The present disclosure further provides the magnetic lighting device, including the bulb, a second magnetic assembly, and the lamp holder as foregoing. The second magnetic assembly is disposed on the bulb. The bulb and the lamp holder are attracted to each other through magnetic attraction between the first magnetic assembly and the second magnetic assembly. A lighting assembly and the internal power supply are disposed in the bulb, the internal power supply is electrically connected to the lighting assembly, a circuit in the lighting assembly is partially and electrically connected to the charging protection board in the lamp holder, so as to supply the power to the internal power supply of the bulb by the lamp holder.

When the external circuit is powered off, the internal power supply is configured to supply the power to the lighting assembly.

Furthermore, the second magnetic assembly is embedded in a top portion of the bulb.

Furthermore, the bulb includes a lampshade, the charging interface is disposed at one end of the lampshade attracted to the lamp holder, the charging connector on the charging protection board passes through the charging interface to be electrically connected to the lighting assembly.

Furthermore, the lighting assembly includes a printed circuit board (PCB) and light emitting diode (LED) lamp beads, the LED lamp beads are disposed on the PCB, terminal is disposed on the PCB, and the terminal is configured to be in contact with the charging connector.

Furthermore, an external interface is defined on an exterior of the lampshade for power supplying and data transmission.

According to the present disclosure, the first magnetic assembly is disposed on an exterior of the lamp holder housing, so that the lamp holder housing and the bulb are attracted to each other to fix the bulb on the lamp holder housing, since the charging protection board is disposed in the lamp holder housing, the charging connector is disposed on the charging protection board, and the charging connector is configured to insert into and connect with the charging interface of the blub when the bulb is fixed on the lamp holder housing, the lamp holder is capable of supplying the power to the internal power supply of the bulb, thereby achieving lighting. Specifically, the charging connector is inserted into the charging interface, so that an activity range of the charging connector is limited, thereby enabling more stable electrical connection between the charging connector and internal structures pf the bulb, current transmission is more stable, so that the lamp holder is capable of supply the power to the bulb electrically connected thereto. In this way, when the lighting assembly in the bulb fails, only a new bulb needs to be replaced to allow for continued lighting without replacing an entire lighting device of the magnetic lighting device, which significantly reduces a cost of the magnetic lighting device. Moreover, the internal power supply in the bulb is configured to store the power and independently supply the power to the lighting assembly. Therefore, when mains electricity is interrupted, the lamp holder cannot transmit the power, the internal power supply in the bulb supplies the power to the lighting assembly in the bulb for emergency lighting, it should be noted that such design of the magnetic lighting device does not require users to frequently detach the bulb from the lamp holder for charging to achieve the emergency lighting, thereby greatly reducing the safety incidents caused by frequently detaching of the bulb of the magnetic lighting device.

BRIEF DESCRIPTION OF DRAWINGS

One or more embodiments are illustrated by corresponding drawings, which serve as exemplary illustrations and do not constitute limitations on the embodiments. Elements with the same reference numerals in the accompanying drawings are represented as similar elements unless otherwise specified, and the accompanying drawings do not constitute a proportion limitation.

Figure 1:
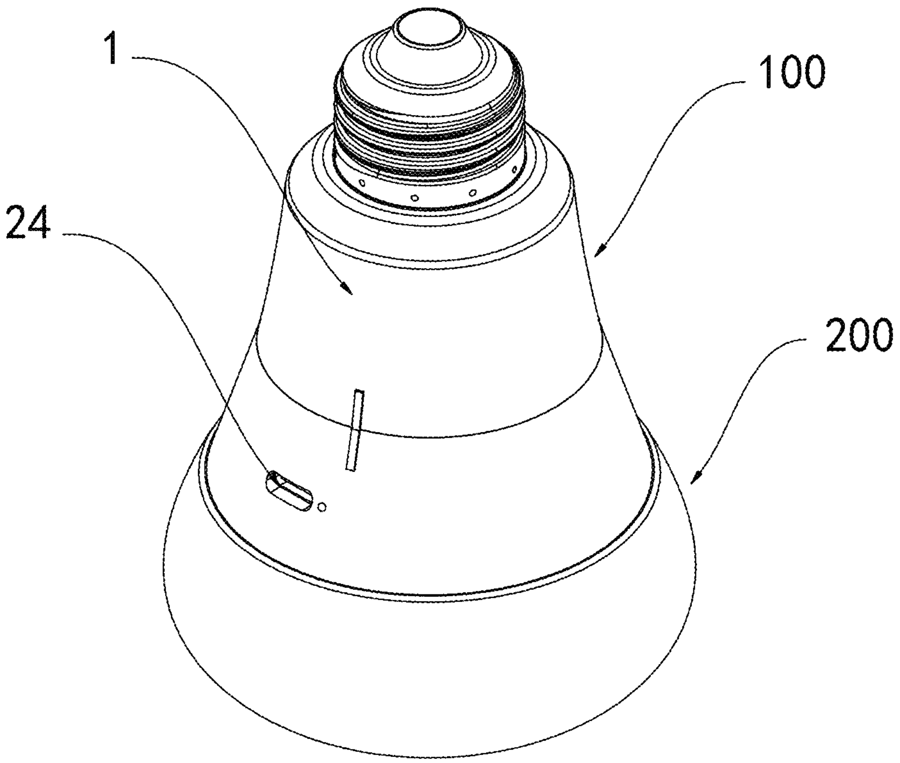
FIG. 1 is a three-dimensional structural schematic diagram of the present disclosure.

Reference numerals in the drawings: 100. lamp holder; 200. bulb; 1. lamp holder housing; 11. charging protection board; 111. charging connector; 12. lamp holder bottom plate; 13. first magnetic assembly; 14. limiting component; 15. connecting component; 16. lamp holder cover; 2. lampshade; 21. second magnetic assembly; 22. internal power supply; 23. printed circuit board; 231. terminal; 24. external interface; 25. switch.

DETAILED DESCRIPTION OF EMBODIMENTS

In order to facilitate understanding of the present disclosure, the present disclosure is described in more detail below with reference to accompanying drawings and specific embodiments. It should be noted that when a component is "fixed to" another component, it may be directly on another component, or there may be one or more intervening components therebetween. When a component is described as being "connected to" another component, it may be directly connected to another component, or there may be one or more intervening components therebetween. Terms "vertical", "horizontal", "left", "right", "inner", "outer", etc., as used herein, are for illustrative purposes only. In description of the present disclosure, terms "first" and "second" are used for descriptive purposes only and cannot be understood as indicating relative importance, or implicitly indicating the number of indicated technical features. Therefore, unless otherwise specified, features defined with the terms "first" and "second" may explicitly or implicitly include one or more of the features; a term "a plurality of" means two or more. A term "include" and any variations thereof are intended to be non-exclusive, and one or more other features, integers, steps, operations, units, assemblies, and/or combinations thereof may exist or added.

In addition, unless otherwise specified and limited, terms "mount", "connect to", and "connect with" should be understood in a broad sense. For example, they may refer to fixed connections, removable connections, or integral connections; they may be mechanical connections or electrical connections; they may be direct connections or indirect connections through intermediate media, or they may be internal communications between two components. All technical and scientific terms used in the specification have the same meanings as commonly understood by those who skilled in the art related to the present disclosure. Terms used in the specification of the present disclosure are for a purpose of describing specific embodiments only and are not intended to limit the present disclosure. A term "and/or" used in the specification includes any and all combinations of one or more of associated listed items.

In addition, technical features involved in different embodiments of the present disclosure described below may be combined with each other as long as they do not conflict with one another.

The present disclosure provides a lamp holder 100, referring to FIGS. 1-4, the lamp holder 100 is configured to cooperate with a bulb 200. The lamp holder 100 includes a lamp holder housing 1, a first magnetic assembly 13, and other structural components necessary for normal operation of the lamp holder 100, for example, electric wires. A charging protection board 11 is disposed in the lamp holder housing 1 and is electrically connected to an external circuit. Specifically, the first magnetic assembly 1 is disposed on exterior of the lamp holder housing 1, the first magnetic assembly 1 is configured to attract the bulb 200 for fixing the bulb 200 on the lamp holder housing 1. A charging connector 15 is disposed on the charging protection board 11, the charging connector 15 is configured to insert into and connect with a charging interface 24 of the blub 200, so as to supply power to an internal power supply 22 of the bulb 200 to achieve lighting. Specifically, the charging connector 15 is inserted into the charging interface 24, so that an activity range of the charging connector 15 is limited, thereby enabling more stable electrical connection between the charging connector 15 and internal structures of the bulb 200, current transmission is more stable, so that the lamp holder 100 is capable of supply the power to the bulb 200 electrically connected thereto. In this way, when a lighting assembly in the bulb 200 fails, only a new bulb needs to be replaced to allow for continued lighting without replacing an entire lighting device of a magnetic lighting device, which significantly reduces a cost of the magnetic lighting device.

Figure 4:
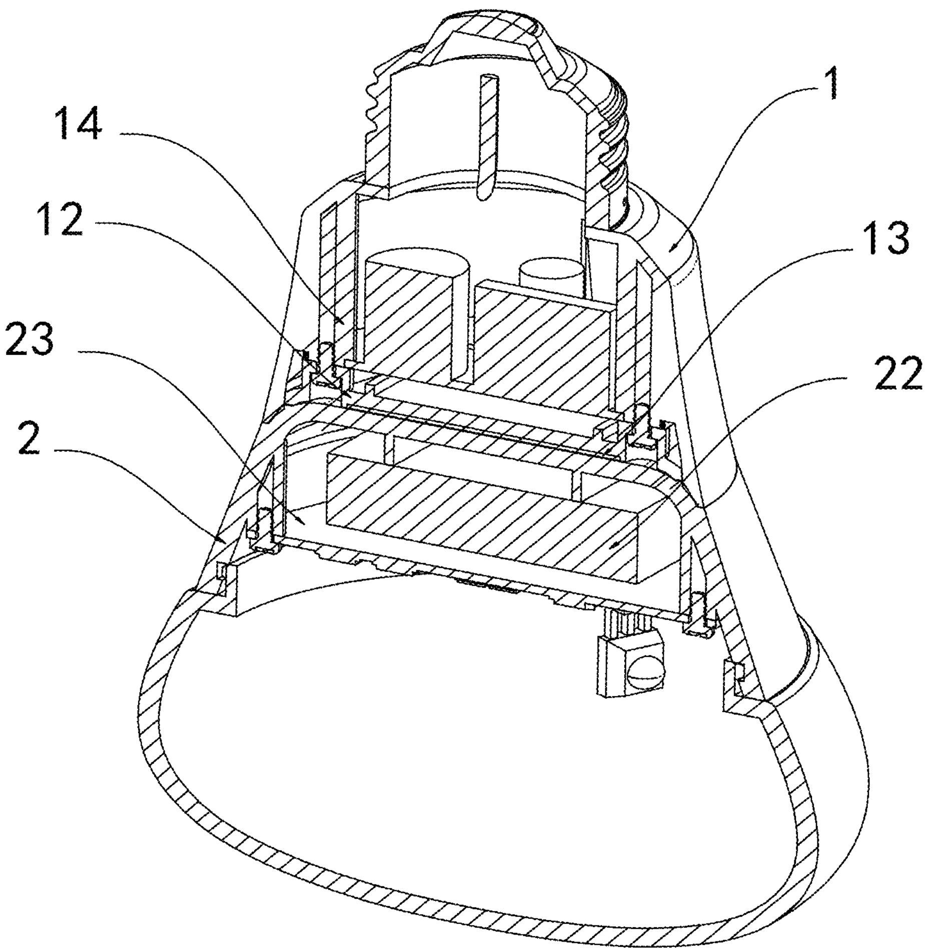
FIG. 4 is another cross-sectional schematic diagram of the present disclosure.

Please refer to FIGS. 1 and 4, in the embodiments, the lamp holder housing 1 includes a connecting component 15 and a lamp holder cover 16 connected to an end portion of the connecting component 15. Specifically, the external circuit is electrically connected to the charging protection board 11 through the connecting component 15. The charging protection board 11 is disposed in the lamp holder cover 16, and the connecting component 15 is selected from a model E12 lamp base, a model E14 lamp base, a model E26 lamp base, or a model E27 lamp base, etc. A thread is disposed on an exterior of the connecting component 15 for connecting to a wall lamp, thereby stabilizing the lamp holder 100 in a place where lighting is required.

In the embodiments, the lamp holder 100 further includes a lamp holder bottom plate 12, the lamp holder bottom plate 12 is detachably disposed at an opening end of the lamp holder housing 1 for sealing the opening end of the lamp holder housing 1, which is convenient for connecting the lamp holder 100 and the bulb 200.

Specifically, an inner wall of the lamp holder housing 1 is connected to the lamp holder bottom plate 12 through limiting components 14, and an outer peripheral surface of the lamp holder bottom plate 12 abuts against an inner wall surface of the lamp holder housing 1.

In the embodiments, first ends of a first part of the limiting components 14 are fixedly connected to the inner wall surface of the lamp holder housing 1 and second ends of the first part of the limiting components 14 are connected to the lamp holder bottom plate 12 through screws. Such design is convenient for detaching the lamp holder bottom plate 12 from the lamp holder housing 1, when there is something wrong in the lamp holder housing 1, the design is convenient for users to check structures installed in the lamp holder housing 1.

In some other embodiments, the first ends of the first part of the limiting components 14 are connected to the inner wall surface of the lamp holder housing 1 through the screws and the second ends of the first part of the limiting components 14 are fixedly connected to the lamp holder bottom plate 12. Such design is also convenient for detaching the lamp holder bottom plate 12 from the lamp holder housing 1, when there is something wrong in the lamp holder housing 1, the design is convenient for the users to check the structures installed in the lamp holder housing 1.

Figure 3:
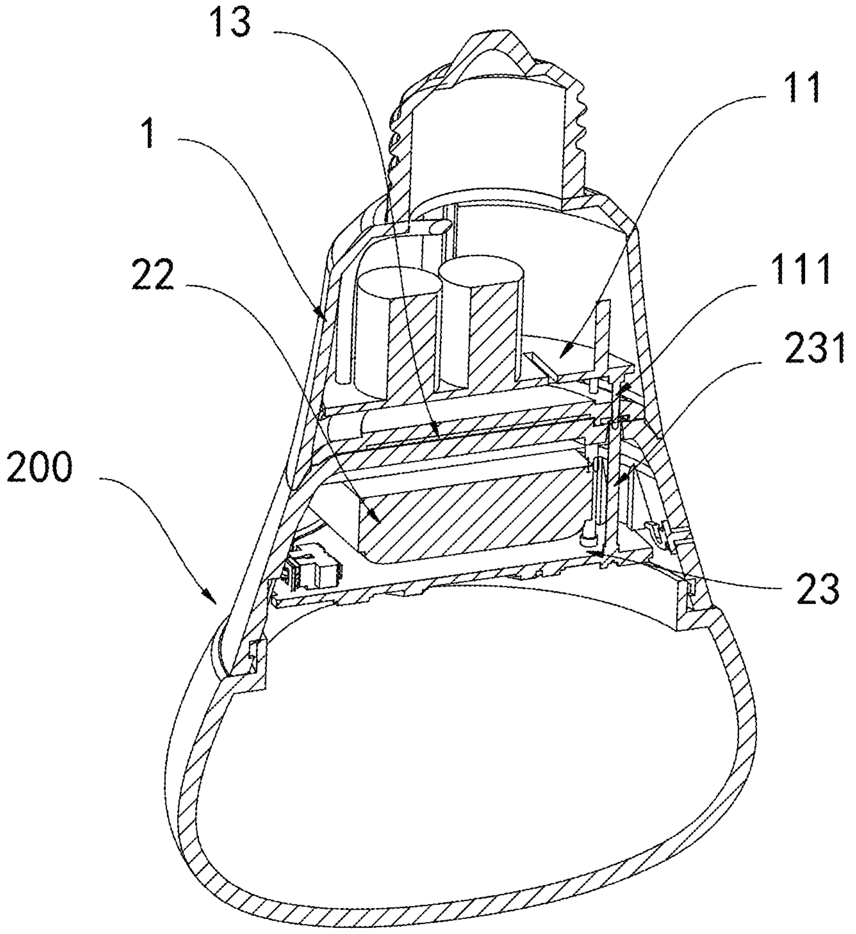
FIG. 3 is a cross-sectional schematic diagram of the present disclosure.

Furthermore, in order to ensure installation stability of the charging protection board 11 in the lamp holder housing 1, please refer to FIGS. 3-4, first ends of a second part of the limiting components 14 are fixedly connected to the inner wall surface of the lamp holder housing 1, second ends of the second part of the limiting components 14 face the lamp holder bottom plate 12, limiting shafts are disposed on a first surface of the lamp holder bottom plate 12 facing an interior of the lamp holder housing 1 corresponding to the second ends of the second part of the limiting components 14. Specifically, an interval is defined between the limiting shafts and the second part of the limiting components 14, the interval is configured to clamp a first part of the charging protection board 11, which limits the charging protection board 11 in the lamp holder housing 1 to a certain extent, and for further limiting a position of the charging protection board 11, a second part of the charging protection board 11 is sleeved around peripheries of the first part of the limiting components 14 connected to the lamp holder bottom plate 12, that is, connecting holes are defined on the charging protection board 11, the first part of the limiting components 14 is respectively inserted into and connected with the connecting holes, so as to securely fix the charging protection board 11 in the lamp holder housing 1 for stably supplying the power to the bulb 200.

In the embodiments, the first part of the limiting components 14 that is respectively inserted into the connecting holes is shaft-shaped, and the second part of the limiting components 14 that form the interval with the limiting shafts is plate-shaped, so as to conveniently clamp the charging protection board 11.

Furthermore, please refer to FIGS. 1, 3, and 4, the charging connector 111 on the charging protection board includes at least one charging spring pin, the charging spring pin is electrically connected to the internal structures of the bulb 200 that cooperate with the lamp holder 100, to achieve a power supply function.

As for a position where the first magnetic assembly 13 is disposed, please refer to FIGS. 1 and 4, in the embodiments, a groove is defined on a second surface of the lamp holder bottom plate 12 facing away from the interior of the lamp holder housing 1, and the first magnetic assembly 13 is disposed in the groove for magnetically attracting the blub 200 to be cooperate with the lamp holder 100.

In the embodiments, the first magnetic assembly 13 includes a first magnet sheet, a first surface of the first magnet sheet is fixedly connected to a bottom portion of the groove, and a second surface of the first magnet sheet opposite thereto is attached to a first surface of the bulb 200 where the charging interface 24 is defined through magnetic attraction. The first magnet sheet is embedded in the groove, so that a bottom surface of the lamp holder bottom plate 12 is attached to the bulb 200.

Furthermore, in order to ensure a more stable connection between the lamp holder 100 and the bulb 200, a periphery of the lamp holder bottom plate 12 of the lamp holder 100 is an inner arc surface, a periphery of a second surface of the bulb 200 attached to the lamp holder bottom plate 12 is an outer arc surface that matches the inner arc surface. In this way, an aesthetic appearance of an overall structure of the lamp holder 100 and the bulb 200 is ensured, and external dust is further prevented from entering a connection between the lamp holder 100 and the bulb 200 to affect stability of supplying the power from the lamp holder 100 to the bulb 200.

In other embodiments, the first magnetic assembly 13 is another magnetic structure, or is a metal sheet, for example, a magnetic structure is disposed on the bulb 200, the magnetic structure magnetically attracts the metal sheet, and the lamp holder 100 and the bulb 200 are further attracted, so that the lamp holder 100 is capable of supplying the power to the bulb 200.

The present disclosure further provides the magnetic lighting device, please refer to FIGS. 1-4, the magnetic lighting device includes the bulb 20, a second magnetic assembly 21, and the lamp holder 100 as foregoing. The second magnetic assembly 21 is disposed on the bulb 200. The bulb 200 and the lamp holder 100 are attracted to each other through magnetic attraction between the first magnetic assembly 13 and the second magnetic assembly 21 on the bulb 200 to connect the lamp holder 100 and the bulb 200 to form a complete magnetic lighting device. A lighting assembly and the internal power supply 22 are disposed in the bulb 200, the internal power supply 22 is electrically connected to the lighting assembly, a circuit in the lighting assembly is partially and electrically connected to the charging protection board 11 in the lamp holder 100, so as to supply the power to the internal power supply 22 of the bulb 200 by the lamp holder 100.

It should be noted that, in the embodiments, when the external circuit is powered off, that is, in a case that mains electricity is interrupted, the internal power supply 22 independently supplies stored power to the lighting assembly for emergency lighting, where the stored power is supplied by the lamp holder 100 before. It should be noted that such design of the magnetic lighting device does not require the users to frequently detach the bulb 200 from the lamp holder 100 for charging, thereby greatly reducing safety incidents caused by frequently detaching of the bulb 200 of the magnetic lighting device.

Regarding the bulb 200, the second magnetic assembly 21 is embedded in a top portion of the bulb 200 and is configured to magnetically attract the first magnetic assembly 13 of the lamp holder 100, thereby connecting the lamp holder 100 and the bulb 200. In the embodiments, the second magnetic assembly 21 also includes a second magnet sheet, and the second magnet sheet is configured to magnetically attract structures in the first magnetic assembly 13.

In the embodiments, the bulb 200 includes a lampshade 2, and the second magnetic assembly 21 is embedded in a top portion of the lampshade 2, which facilitates the magnetic attraction between the second magnetic assembly 21 and the first magnetic assembly 13.

In the embodiments, the charging interface 24 is disposed at one end of the lampshade 2 attracted to the lamp holder 100, the charging connector 111 on the charging protection board 11 passes through the charging interface 24 to be electrically connected to the lighting assembly. The lighting assembly includes a printed circuit board (PCB) 23 and light emitting diode (LED) lamp beads, the LED lamp beads are disposed on the PCB 23, a terminal 231 is disposed on the PCB 23, and the terminal 231 is configured to be in contact with the charging connector 111.

Regarding how electrical connection between the lamp holder 100 and the bulb 200 is achieved, the mains electricity is transmitted to the charging protection board 11 via circuits, and the charging protection board 11 then passes the power to the charging connector 111. In the embodiments, the charging connector 111 includes the at least one charging spring pin. The charging connector 111 passes through the charging interface 24 and transmits the power to the terminal 231 on the PCB 23 being in contact therewith, which allows the lighting assembly to light and the internal power supply 22 to charge.

In the embodiments, please refer to FIGS. 1 and 4, in order to achieve diversification of the bulb 200, an external interface 24 is defined on an exterior of the lampshade 2 for power supplying and data transmission. In this way, intelligence of the bulb 200 is enhanced, for example, remote control of the bulb 200, such as adjustment of a brightness level of the bulb 200 is enabled.

Figure 2:
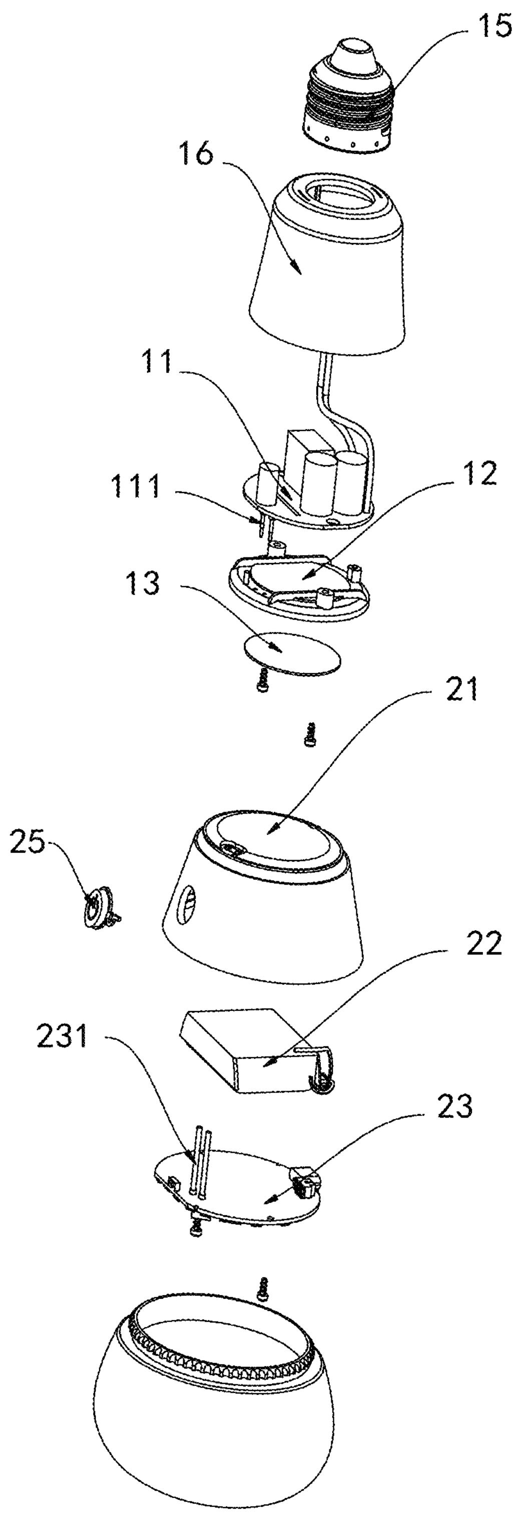
FIG. 2 is an exploded schematic diagram of the present disclosure.

Furthermore, please refer to FIG. 2, a switch 25 is further disposed on the lampshade 2, the switch 25 is configured to control internal circuits of the bulb 200, and such design enables the bulb 200 to be configured as an independent night lamp, in this way, the bulb 200 is capable of being removed from the lamp holder 100 and being separately placed in other places requiring lights, and the switch 25 is configured to cooperate with the internal circuits of the bulb 200 for achieving lighting, moreover, in some embodiments, the switch 25 is further configured to be pressed for multiple times to adjust different lighting colors of bulb 200.

The above embodiments are only used to illustrate technical solutions of the present disclosure and are not limited thereto. Under an idea of the present disclosure, the technical features involved in the above embodiments or different embodiments may also be combined, steps may be implemented in any order, and there are many other variations of the different aspects of the present disclosure as described above, which are not provided in detail for the sake of brevity. Although the present disclosure is described in detail with reference to the foregoing embodiments, those who skilled in the art should understand that the technical solutions described in the foregoing embodiments may still be modified, or some of the technical features may be equivalently replaced; and these modifications or replacements do not make the essence of corresponding technical solutions fall within a scope of the technical solutions of the embodiments of the present disclosure.

What is claimed is:

1. A lamp holder, configured to cooperate with a bulb, comprising:

a lamp holder outer case, having an inner cavity, wherein a charging protection board is received in the inner cavity and is configured to be connected to a circuit outside of the lamp holder outer case; and a first magnetic assembly, configured to be absorbed with a bulb to fix the bulb to the lamp holder outer case;

wherein the charging protection board is arranged with a charging connector, the charging connector extends through the lamp holder outer case;

when the lamp holder outer case is fixed with the bulb, the charging connector is configured to insert into and connect with a charging interface of the bulb, so as to supply power to an internal power supply of the bulb; or the charging connector is configured to connect with and supply power to a printed circuit board (PCB) arranged inside the bulb.

2. The lamp holder according to claim 1, wherein the lamp holder outer case further comprises a lamp bracket and a lamp holder bottom plate, the lamp holder bottom plate and the lamp bracket cooperatively define the inner cavity; the lamp holder bottom plate is detachably disposed at an opening end of the lamp bracket for sealing the opening end of the lamp bracket.

3. The lamp holder according to claim 2, wherein an inner wall of the lamp bracket is connected to the lamp holder bottom plate through limiting components, and an outer peripheral surface of the lamp holder bottom plate abuts against an inner wall surface of the lamp bracket.

4. The lamp holder according to claim 3, wherein first ends of a first part of the limiting components are fixedly connected to the inner wall surface of the lamp bracket and second ends of the first part of the limiting components are connected to the lamp holder bottom plate through screws, or, the first ends of the first part of the limiting components are connected to the inner wall surface of the lamp bracket through the screws and the second ends of the first part of the limiting components are fixedly connected to the lamp holder bottom plate;

first ends of a second part of the limiting components are fixedly connected to the inner wall surface of the lamp bracket, second ends of the second part of the limiting components face the lamp holder bottom plate, limiting shafts are disposed on a first surface of the lamp holder bottom plate facing an interior of the lamp bracket corresponding to the second ends of the second part of the limiting components; and an interval is defined between the limiting shafts and the second part of the limiting components, a first part of the charging protection board is clamped in the interval, and a second part of the charging protection board is sleeved around outer peripheries of the first part of the limiting components connected to the lamp holder bottom plate.

5. The lamp holder according to claim 2, wherein a groove is defined on a second surface of the lamp holder bottom plate facing away from inner cavity, and the first magnetic assembly is disposed in the groove.

6. The lamp holder according to claim 5, wherein the charging protection board is disposed at a side of the lamp holder bottom plate facing towards the inner cavity.

7. The lamp holder according to claim 2, wherein the charging connector extends through the lamp holder bottom plate.

8. A magnetic lighting device, being easy to power, comprising:

the bulb;

a second magnetic assembly, arranged on a side surface of the bulb; and the lamp holder according to claim 1;

wherein the second magnetic assembly is disposed on the bulb;

the bulb and the lamp holder are attracted to each other through magnetic attraction between the first magnetic assembly and the second magnetic assembly;

a lighting assembly and the internal power supply are disposed in the bulb, the internal power supply is electrically connected to the lighting assembly, the lighting assembly comprises the PCB and a plurality of light-emitting diode (LED) beads arranged on the PCB; the PCB is electrically connected to the charging connector in the lamp holder or the internal power supply is electrically connected to the charging connector, so as to supply the power to the internal power supply of the bulb by the lamp holder; and when the external circuit is powered off, the internal power supply is configured to supply the power to the lighting assembly.

9. The magnetic lighting device according to claim 8, wherein the second magnetic assembly is embedded in a top portion of the bulb.

10. The magnetic lighting device according to claim 9, wherein the bulb comprises a lampshade, the charging interface is disposed at one end of the lampshade attached to the lamp holder, the charging connector on the charging protection board passes through the charging interface to be electrically connected to the lighting assembly.

11. The magnetic lighting device according to claim 10, wherein the lighting assembly comprises a printed circuit board (PCB) and light emitting diode (LED) lamp beads, the LED lamp beads are disposed on the PCB, a terminal is disposed on the PCB, and the terminal is configured to be in contact with the charging connector.

12. The magnetic lighting device according to claim 10, wherein an external interface is defined on an exterior of the lampshade for power supplying and data transmission.

* * * * *